(12) United States Patent
Jiang et al.

(10) Patent No.: US 9,983,736 B1
(45) Date of Patent: May 29, 2018

(54) OPTICAL TOUCH SENSOR

(71) Applicants: Peigen Jiang, Sammamish, WA (US); Zhonghua Liu, Beijing (CN)

(72) Inventors: Peigen Jiang, Sammamish, WA (US); Zhonghua Liu, Beijing (CN)

( * ) Notice: Subject to any disclaimer, the term of this patent is extended or adjusted under 35 U.S.C. 154(b) by 0 days. days.

(21) Appl. No.: 15/437,064

(22) Filed: Feb. 20, 2017

(51) Int. Cl.
*G06F 3/042* (2006.01)

(52) U.S. Cl.
CPC .................. *G06F 3/0421* (2013.01)

(58) Field of Classification Search
CPC .................................................. G06F 3/0421
USPC ........................................................ 345/175
See application file for complete search history.

(56) References Cited

U.S. PATENT DOCUMENTS

| 3,776,640 | A | * | 12/1973 | Ikegami | G01B 11/02 250/559.07 |
| 6,160,620 | A | * | 12/2000 | Danek | G01B 11/14 356/4.01 |
| 6,768,100 | B1 | * | 7/2004 | Brown | G01D 5/34 250/230 |
| 2003/0111588 | A1 | * | 6/2003 | Chen | G06F 3/0421 250/208.1 |
| 2007/0194253 | A1 | * | 8/2007 | Nishizawa | G01J 3/42 250/493.1 |
| 2008/0272313 | A1 | * | 11/2008 | Van Herpen | G01N 21/6428 250/459.1 |
| 2009/0066880 | A1 | * | 3/2009 | Sugita | G02B 6/0038 349/64 |
| 2009/0163787 | A1 | * | 6/2009 | Mannheimer | A61B 5/14552 600/324 |
| 2012/0327267 | A1 | * | 12/2012 | Takahara | G02B 7/34 348/231.99 |
| 2013/0083316 | A1 | * | 4/2013 | Mimeault | A47B 53/02 356/73 |
| 2013/0334408 | A1 | * | 12/2013 | Stolin | H01L 31/024 250/227.24 |
| 2014/0240585 | A1 | * | 8/2014 | Takahara | G02B 7/34 348/345 |
| 2017/0023488 | A1 | * | 1/2017 | Okamoto | G01N 21/8806 |
| 2017/0225918 | A1 | * | 8/2017 | Cant | B65H 7/14 |

* cited by examiner

*Primary Examiner* — Fred Tzeng

(57) ABSTRACT

An optical touch sensor is disclosed which includes a first and a second light detector mounted side by side forming a gap therebetween, the first and the second light detector commonly facing a touch sensing surface area, and a light emitter mounted behind the first and second light detector and aligned with the gap, wherein a light beam emitted from the light emitter can pass through the gap.

19 Claims, 4 Drawing Sheets

OPTICAL TOUCH SENSOR

BACKGROUND

The present invention relates generally to optical touch sensor, and, more particularly, to an optical touch sensor having emitters and light detectors located on the same side.

Optical touch sensor employs light to detect the presence of one or more objects over a surface area. A conventional optical touch sensor employs an array of infrared (IR) light emitters located on one side of the surface area, and an array of IR light detectors located on an opposite side of the surface area. The array of IR light emitters is sequentially turned on one at a time to emit invisible IR light, which can be detected by at least one of the array of IR light detectors located directly opposite to the turned on light emitter if the light path is not blocked, otherwise there must be an object, such as a finger, placed on the surface blocking the light path. Therefore, the presence of the object on the surface and location thereof can be detected. Conventionally, to detect both x and y coordinates of an object, two sets of such light emitter and detector arrays must be deployed, one for each coordinate. Thus, all four sides of the surface area are surrounded by either the light emitters or the light detectors. Such conventional optical touch sensor apparently presents a significant structural limitation for its application.

As such, what is desired is an IR touch sensor that can be deployed only on one side of a surface area intended for touch sensing.

SUMMARY

An optical touch sensor is herein provided. One exemplary optical touch sensor includes a first and a second light detector mounted side by side forming a gap therebetween, the first and the second light detector commonly facing a touch sensing surface area, and a light emitter mounted behind the first and second light detector and aligned with the gap, wherein a light beam emitted from the light emitter can pass through the gap.

Figure 1:
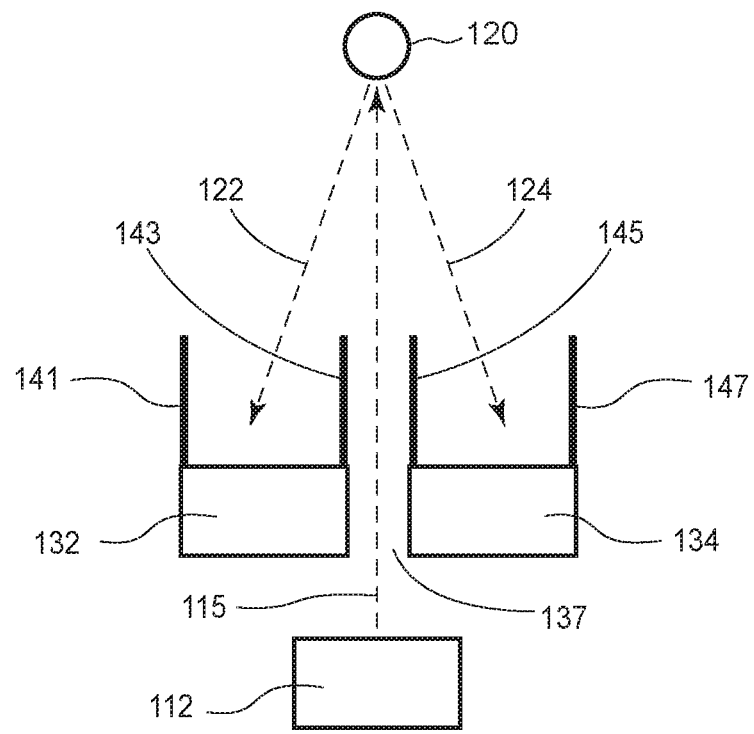
FIG. 1 illustrates a basic structure of an optical touch sensor in accordance with an embodiment of the present invention.

The drawings accompanying and forming part of this specification are included to depict certain aspects of the invention. A clearer conception of the invention, and of the components and operation of systems provided with the invention, will become more readily apparent by referring to the exemplary, and therefore non-limiting, embodiments illustrated in the drawings, wherein like reference numbers (if they occur in more than one view) designate the same elements. The invention may be better understood by reference to one or more of these drawings in combination with the description presented herein.

DESCRIPTION

The present invention relates to an optical touch sensor, particularly, a touch sensor with IR emitters and detectors located on the same side. Preferred embodiments of the present invention will be described hereinafter with reference to the attached drawings.

FIG. 1 illustrates a basic structure of an optical touch detector in accordance with an embodiment of the present invention. As shown in FIG. 1, the optical touch detector includes two exemplary light detectors 132 and 134 mounted in a straight line facing a touch sensing surface area, where an object 120 may come into contact. The two light detectors 132 and 134 are mounted close to each other but leaves a small gap 137 between them. A light emitter 112 is mounted behind the two light detectors 132 and 134 and facing the gap 137, so that a narrow light beam 115 passes through the gap 137 when the light emitter 112 is turned on. Since width of a light emitting element inside the light emitter 112 is generally smaller than 0.5 mm, in an embodiment, the gap 137 is set at 0.8 mm.

Referring again to FIG. 1, when the object 120 comes into contact with the touch sensing surface area in the path of the light beam 115, the emitted light 115 will be partially reflected. The reflection is exemplarily represented by light beams 122 and 124 that can be detected by the light detectors 132 and 134. In such a way, the presence of the object 120 can be detected by the optical touch sensor.

As shown in FIG. 1, there are two light blocking plates 141 and 143 in front of the light detector 132 forming a channel limiting the in-coming light 122 to a small angle. Similarly, light blocking plates 145 and 147 are mounted in front of the light detector 134 forming a channel limiting the in-coming light 124 to a small angle. In an embodiment, the light blocking plates 141, 143, 145 and 147 have the same dimension, and are mounted in parallel to each other and perpendicular to the face of the light detector 132 or 134. For illustration purpose, the light blocking plates 141 and 143 and the light detector 132 are viewed as a light detecting assembly. Similarly, the light blocking plates 145 and 147 and the light detector 134 are viewed as another light detecting assembly. In embodiments, such light detecting assemblies are identical. In embodiments, the light emitter 112 is an IR light emitting diode (LED); and the light detectors 132 and 134 are either photodiodes or photo transistors sensitive to IR light.

Figure 2:
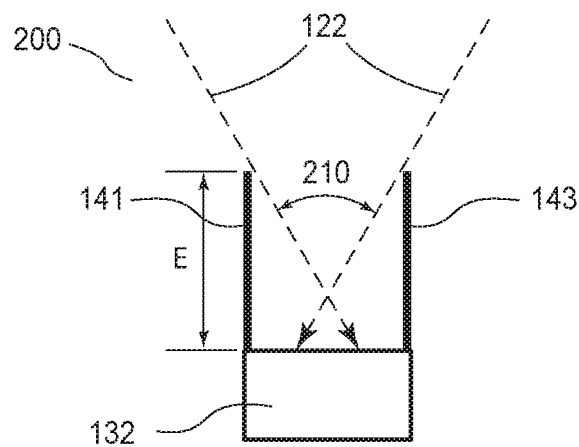
FIG. 2 illustrates a light detecting assembly with an effective view angle.

FIG. 2 illustrates a light detecting assembly 200 with an effective view angle 210. For a given light detector 132, the effective view angle 210 is determined by a length (E) of the light blocking plate 141 or 143. The longer the E, the smaller the effective view angle 210. The effective view angle 210 is generally set at a value smaller than an inherent view angle of the light detector 132, so that the effective view angle 210 can be controlled by the length E, and uniform among all the light detecting assemblies in a touch sensor detector. For a given application, the effective view angle 210 is predetermined and fixed.

Figure 3:
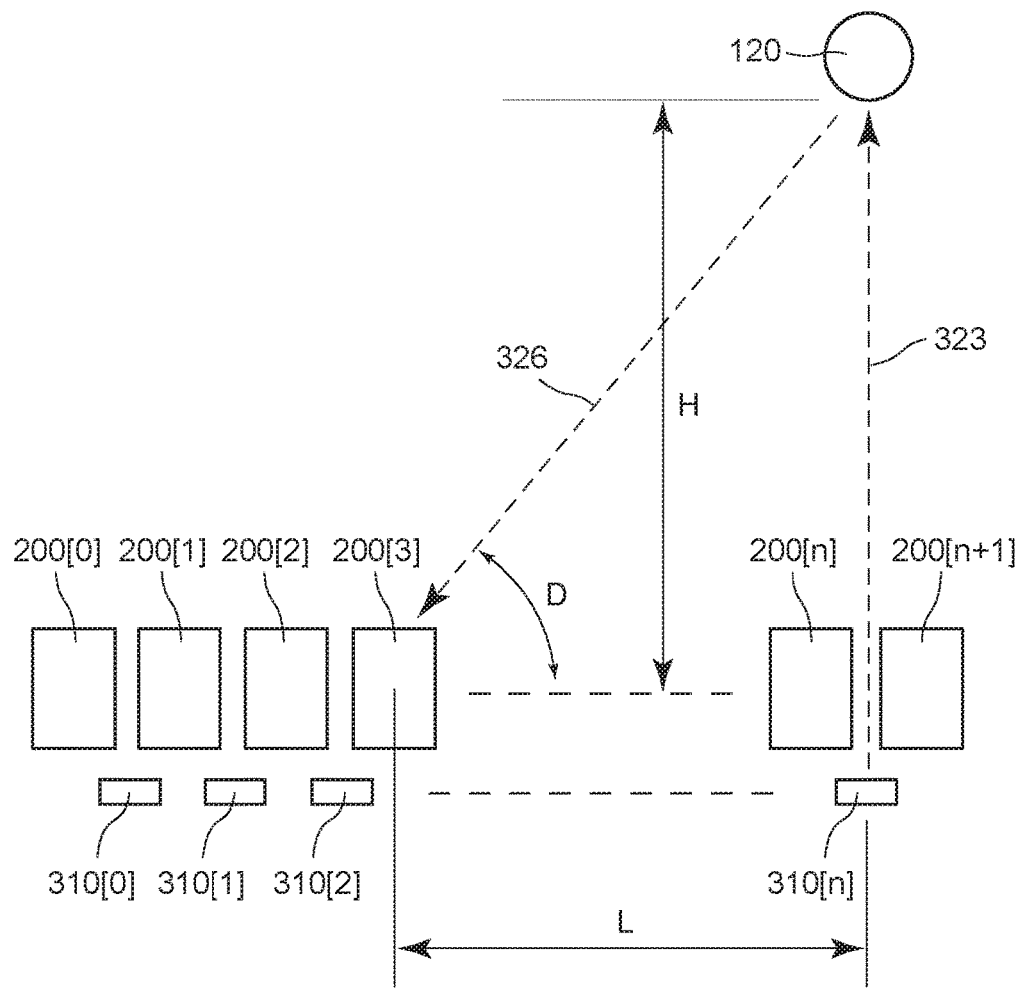
FIG. 3 illustrates a mechanism for obtaining coordinates by the optical touch sensor in accordance with an embodiment of the present invention.

FIG. 3 illustrates a mechanism for obtaining coordinates by the optical touch sensor in accordance with an embodiment of the present invention. As shown in FIG. 3, an array of light detecting assemblies 200[0–(n+1)] is mounted side-by-side with each other in a straight line commonly facing a touch sensing area which is represented by the object 120.

A gap between two neighboring light detecting assemblies is uniform throughout the entire array. Aligned to each gap is a light emitter 310[$i$], where i=0-n, for generating a light beam to detect objects on the touch sensing area. For instance, the light emitter 310[0] is aligned to the gap between the light detecting assemblies 200[0] and 200[1]. The array of light emitters 310[0-n] is sequentially turned on, one at a time, for a predetermined period of time, such as 20 ns, so that coordinate in the horizontal direction can be determined from the location of the light emitter 310[$i$] whose emitted light is reflected by an object at a particular moment.

As shown in FIG. 3, the light emitter 310[$n$] is turned on at the moment, an emitted light beam 323 therefrom is reflected by the object 120. Because the light detecting assemblies 200[0-(n-1)] have a predetermined effective view angle, the light detecting assembly 200[3] is the farthest one away from the light emitter 310[$n$] that can detect the reflected light beam 326. An angle, D, formed between the reflected light beam 326 and the horizontal line is defined by (90 degree-(effective view angle)/2). As a horizontal distance L between the light emitter 310[$n$] and the light detecting assembly 200[3], is known, a vertical distance, H, between the object 120 and the light detecting array 200 can be obtained from an equation: H=L*tan(D).

Figure 4:
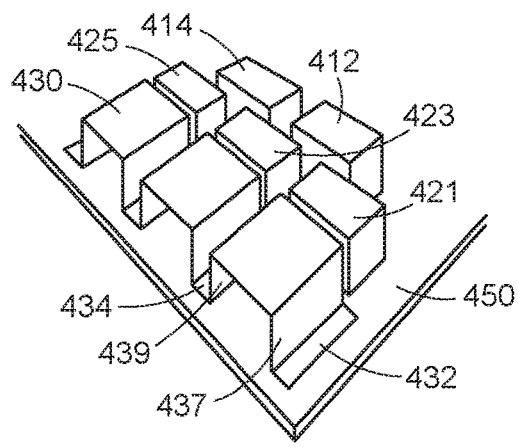
FIG. 4 is a perspective view of a part of the optical touch sensor in accordance with an embodiment of the present invention.

FIG. 4 is a perspective view of a part of the optical touch sensor in accordance with an embodiment of the present invention. The optical touch sensor includes exemplary light emitters 412 and 414, aligned to gaps formed by exemplary light detector 421, 423 and 425. Both the light emitters 412 and 414 and the light detectors 421, 423 and 425 are mounted to a printed circuit board 450 by either soldering or gluing. Also mounted to the printed circuit board 450 in front of the light detectors 421, 423 and 425 is a corrugated structure 430 made of a light blocking yet non-reflective material, such as copper with a coarse surface painted in black. Horizontal portions 432 and 434 of the corrugated structure 430 serve as surfaces for soldering or gluing the corrugated structure 430 to the printed circuit board 450. As an example, vertical portions 437 and 439 serve as light blocking plates for the light detector 421. The vertical portions 437 and 439 and the light detector 421 form a light detecting assembly 200 of FIG. 2. A gap above the horizontal portion 434 is aligned to the gap between the light detectors 421 and 423 to allow an emitted light beam from the light emitter 412 to pass through and reach a touch sensing surface area.

Figure 5:
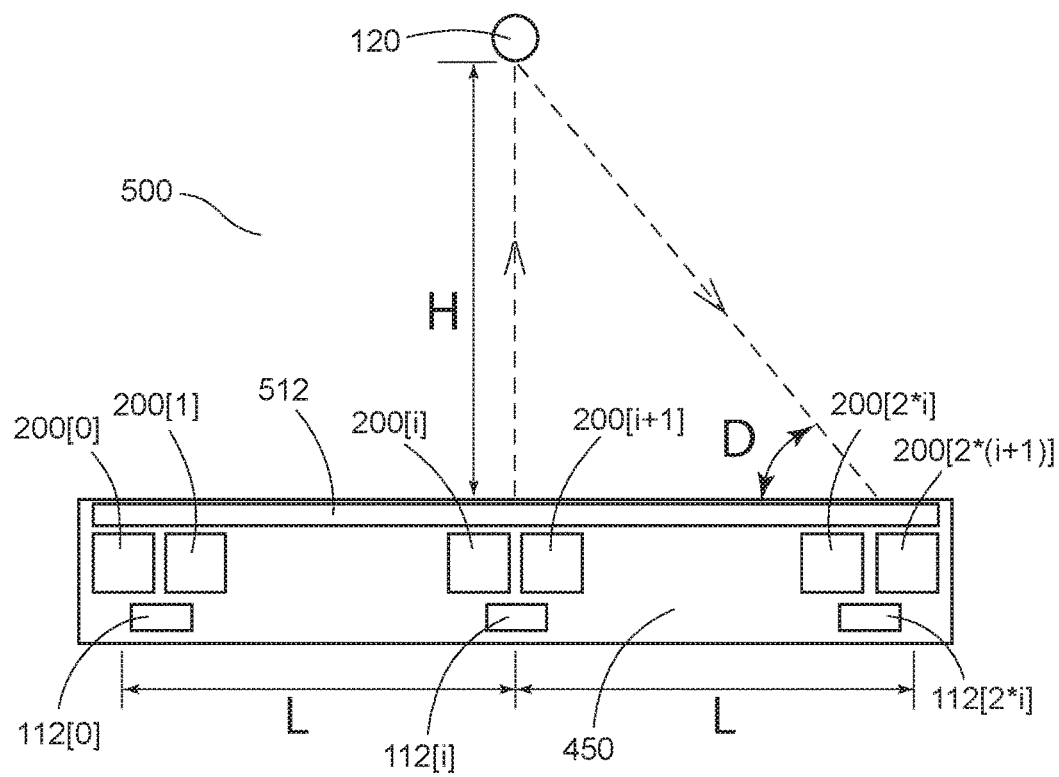
FIG. 5 is a top view of a module of the optical touch senor in accordance with an embodiment of present invention.

FIG. 5 is a top view of a module 500 of the optical touch sensor in accordance with an embodiment of present invention. The module 500 includes 2*(i+1)+1 number of light detecting assemblies 200, and 2*i+1 number of light emitters 112 mounted on the printed circuit board 450. In addition, a light filter strip 512 is mounted in front of the light detecting assemblies 200. The light filter strip 512 filters out light not emitted by the light emitters 112 for preventing interference from ambient light. A width, 2*L, of the module 500 is determined by a maximum vertical distance H between an object and the module 500 for a given effective view angle, which is 2*(90 degree-D), of the light detecting assemblies 200. The maximum vertical distance H is a depth of a touch sensing surface area. When the object 120 is directly facing the center light emitter 112[$i$] and at the distance H, all the light detecting assemblies 200 including the one at the very edge start to be able to detect the reflected light. Then L=H/tan(D). For a given effective view angle and a desired depth (H) of a touch sensing surface area, a width (2*L) of the module 500 is at a minimum when so determined, so that the number of light emitters 112 is kept at minimum for shortening a scanning cycle time. When the scanning cycle time is short, the module 500 has fast detecting response time. When wider touch sensing surface area is desired, multiple modules 500 can be used as shown in FIG. 6.

Figure 6:
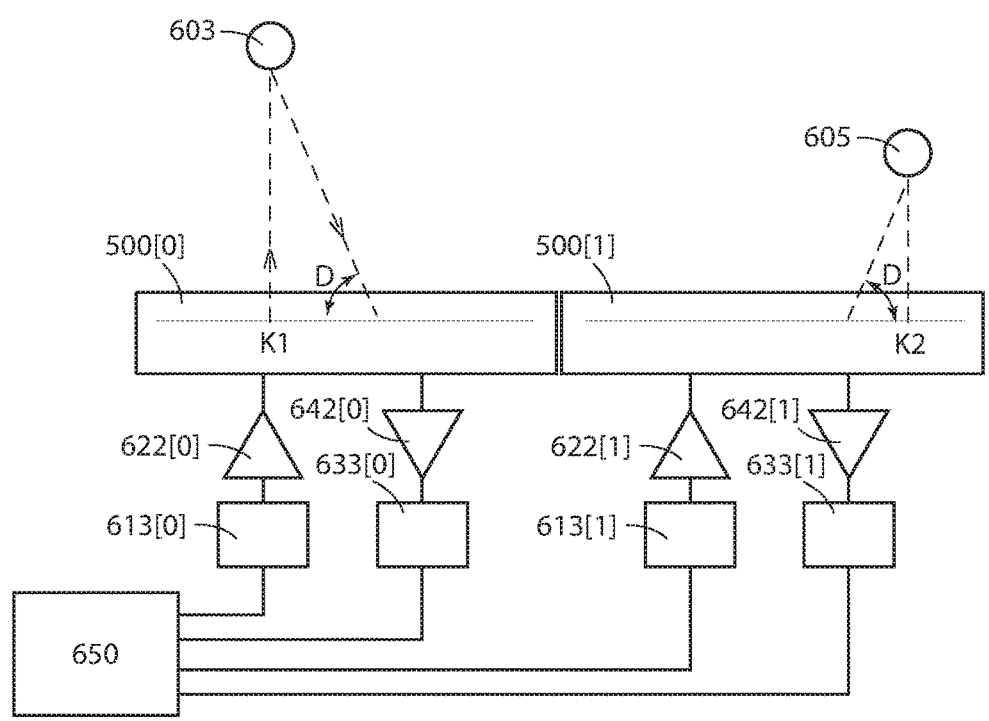
FIG. 6 is a block diagram illustrating a touch sensing system in accordance with an embodiment of the present invention.

FIG. 6 is a block diagram illustrating a touch sensing system in accordance with an embodiment of the present invention. The touch sensing system includes two identical touch sensing modules 500[0] and 500[1] placed in a straight line. A decoding circuit 613[0] is coupled to light emitters in the touch sensing module 500[0] through a driver circuit 622[0]. The decoding circuit 613[0] receiving control signals from a processor 650 to sequentially turn on one emitter at a time in a scanning cycle. An encoding circuit 633[0] is coupled to the light detectors in the touch sensing module 500[1] through an amplifier circuit 642[0]. The encoding circuit 633[0] converts a number of light detectors that detect reflected light into a binary coded decimal (BCD) signal and send it to the processor 650. An identical set of decoding circuit 613[1] and encoding circuit 633[1] is coupled the processor 650 to the touch sensing module 500[1] through a driver circuit 622[1] and an amplifier circuit 642[1], respectively. The processor 650 controls scanning of both the touch sensing modules 500[0-1] independently and translate the locations of the light emitters and detectors that interact with an object into coordinates of the object. In an embodiment, because reflected light is generally symmetrical around an original light, when a turned-on light emitter K1 is located in a left half of the touch sensing module 500[0] and the scanning is from left to right, only the light detectors to the right of the light emitter K1 is used for detecting reflected light. When a turned-on light emitter K2 is located in the right half of the touch sensing module 500[1] and the scanning is also from left to right, only the light detectors to the left of the light emitter K2 is used for detecting reflected light.

While this disclosure has been particularly shown and described with references to exemplary embodiments thereof, it shall be understood by those skilled in the art that various changes in form and details may be made therein without departing from the spirit of the claimed embodiments.

What is claimed is:

1. An optical touch sensor comprising:
   a first and a second light detector mounted side by side forming a gap therebetween, the first and the second light detector commonly facing a touch sensing surface area; and
   a light emitter mounted behind the first and second light detector and aligned with the gap,
   wherein a light beam emitted from the light emitter can pass through the gap.

2. The optical touch sensor of claim 1 further comprising a first and a second light blocking plate mounted in front of and both substantially perpendicular to the first light detector, the first and second light blocking plate being substantially identical and limiting an effective view angle of the first light detector to a predetermined degree.

3. The optical touch sensor of claim 2, wherein the effective view angle is smaller than an inherent view angle of the first light detector.

4. The optical touch sensor of claim 2, wherein the first and the second light blocking plate are parts of a corrugated structure.

5. The optical touch sensor of claim 4, wherein the first and second light detector, the light emitter and the corrugated structure are mounted on a printed circuit board.

6. The optical touch sensor of claim 2 further comprising:
a third light detector mounted at the same straight line where the first and the second light detector are mounted at; and
a processor configured to obtain a distance between a sensed object and the straight line from a distance between the third and the first light detector and an effective view angle of the third light detector.

7. The optical touch sensor of claim 6, wherein the first, the second and the third light detector are limited by their respective light blocking plates to have substantially the same effective view angle.

8. The optical touch sensor of claim 1, wherein the first and the second light detector are selected from the group consisting of photodiode and photo transistor.

9. The optical touch sensor of claim 1, wherein the light emitter is a light emitting diode (LED).

10. The optical touch sensor of claim 1 further comprising a light filter in front of the first and the second light detector.

11. An optical touch sensor comprising:
a first and a second light detector mounted side by side forming a gap therebetween, the first and the second light detector commonly facing a touch sensing surface area;
a first and a second light blocking plate mounted in front of and both substantially perpendicular to the first light detector, the first and second light blocking plate being substantially identical and limiting an effective view angle of the first light detector to a predetermined degree; and
a light emitter mounted behind the first and second light detector and aligned with the gap, wherein a light beam emitted from the light emitter can pass through the gap.

12. The optical touch sensor of claim 11, wherein the effective view angle is smaller than an inherent view angle of the first light detector.

13. The optical touch sensor of claim 11, wherein the first and second light blocking plate are parts of a corrugated structure.

14. The optical touch sensor of claim 13, wherein the first and the second light detector, the light emitter and the corrugated structure are mounted on a printed circuit board.

15. The optical touch sensor of claim 11 further comprising:
a third light detector mounted at the same straight line where the first and the second light detector are mounted at; and
a processor configured to obtain a distance between a sensed object and the straight line from a distance between the third and the first light detector and the effective view angle of the third light detector.

16. The optical touch sensor of claim 15, wherein the first, the second and the third light detector are limited by their respective light blocking plates to have substantially the same effective view angle.

17. The optical touch sensor of claim 11, wherein the first and the second light detector are selected from the group consisting of photodiode and photo transistor.

18. The optical touch sensor of claim 11, wherein the light emitter is a light emitting diode (LED).

19. The optical touch sensor of claim 11 further comprising a light filter in front of the first and the second light detector.

* * * * *